A. CHERMAK.
OIL MACHINE.
APPLICATION FILED DEC. 27, 1919.

1,344,261.

Patented June 22, 1920.
2 SHEETS—SHEET 1.

Inventor
A. Chermak

By
Attorney

A. CHERMAK.
OIL MACHINE.
APPLICATION FILED DEC. 27, 1919.
1,344,261.
Patented June 22, 1920.
2 SHEETS—SHEET 2.
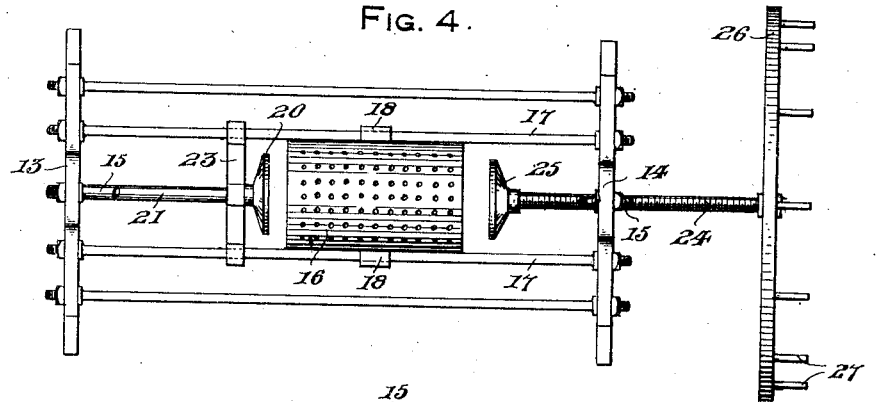
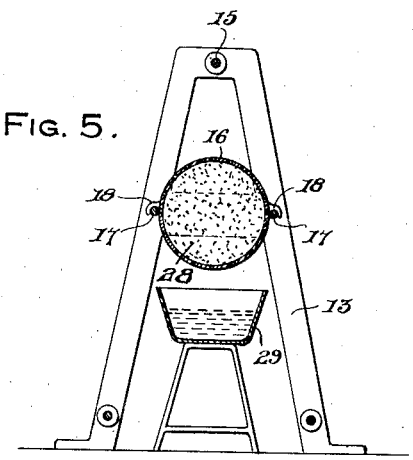
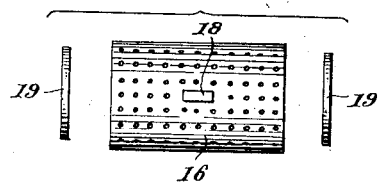
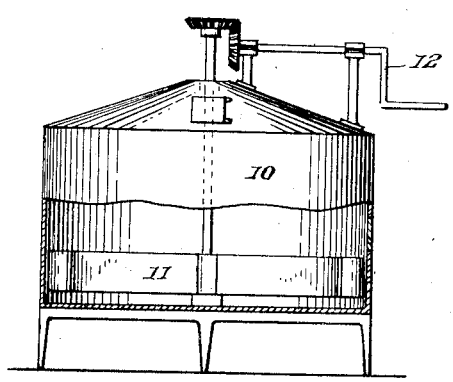
Inventor
A. Chermak
By
Attorney

UNITED STATES PATENT OFFICE.

ANDREW CHERMAK, OF PRINCE GEORGE, VIRGINIA.

OIL-MACHINE.

1,344,261.　　　　Specification of Letters Patent.　　Patented June 22, 1920.

Application filed December 27, 1919. Serial No. 347,707.

*To all whom it may concern:*

Be it known that I, ANDREW CHERMAK, a citizen of Czechoslovakia, residing at Prince George, in the county of Prince George and State of Virginia, have invented certain new and useful Improvements in Oil-Machines, of which the following is a specification.

The primary object of the invention is to provide an oil press adapted for extracting oil from grain and other raw material, the structure possessing great strength and capable of extracting substantially all of the contained oil.

A further object of the invention is to provide a press for the extraction of oil that is simple in construction, readily disassembled for cleaning and by means of which oil bearing material may be readily and quickly operated upon for extracting a maximum amount of oil.

With these general objects in view, the invention consists of the novel combination and arrangement of parts hereinafter fully described in connection with the accompanying drawings and in which like reference characters designate corresponding parts throughout the several views.

In the drawings,

Fig. 4 is a top plan view of the invention,

Fig. 5 is a vertical transverse sectional view taken upon line V—V of Fig. 1,

Fig. 6 is a side elevation of the holder for the raw product, and

Fig. 7 is an elevational view partly in section of a mixer and heater for preparing the product for the oil extracting process.

Figure 1:
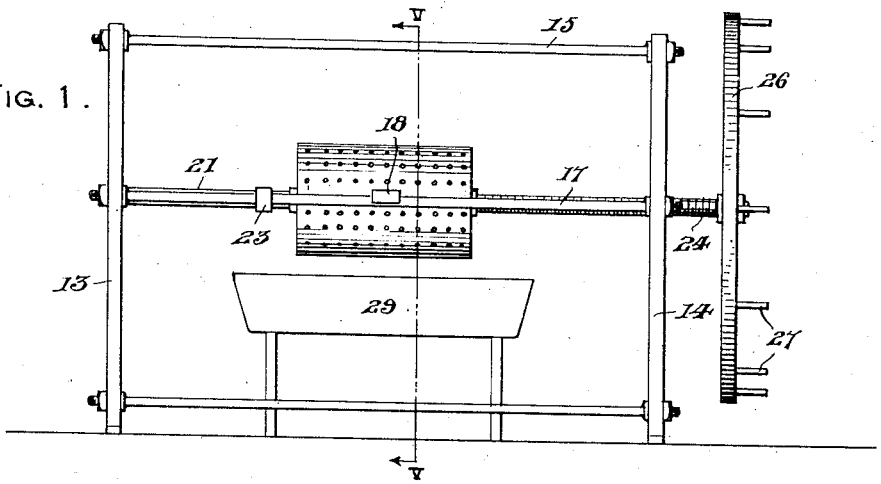
Figure 1 is a side elevation of my oil press positioned for use.
Figure 2:
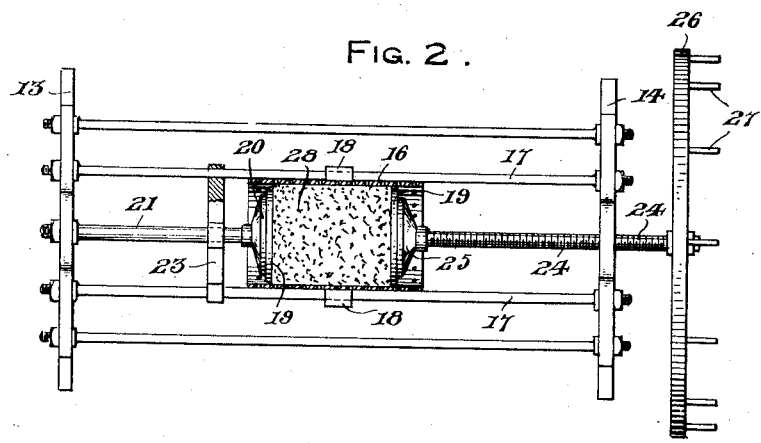
Fig. 2 is a horizontal sectional view thereof.
Figure 3:
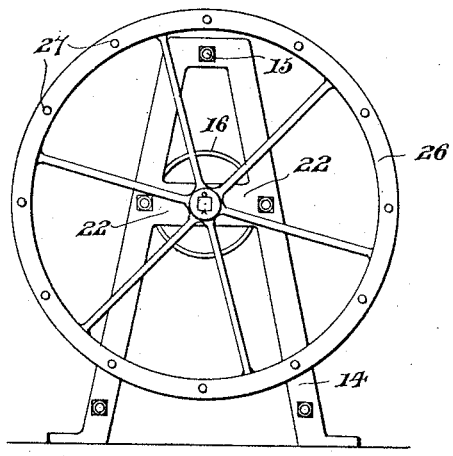
Fig. 3 is an end elevation of the same.

My invention contemplates the extraction of oil from oil containing grain such as wheat by mixing the milled grain such as flour with water in any suitable manner such as by means of the mixer shown in Fig. 7, and consisting of a casing 10 having a stirrer 11 revolubly mounted therein and operated by a crank 12 at the top of the casing. The grain is also heated within the casing 10 and in the heated moistened state is ready for the extraction of the oil.

Oppositely positioned uprights 13 and 14 are set up wherever it is desired to position the oil press, the said uprights being substantially A-shaped connected together by braces 15.

A perforated cylinder 16 is slidably mounted upon the parallel braces 17 connected between the uprights 13 and 14, opposite ears 18 upon said cylinder being freely mounted upon said rods or braces 17.

The heated flour or grain is placed in the cylinder 16 through either open end thereof and a pressing disk 19 forced into each end of the cylinder contacting the grain. A stationary head 20 is secured upon the inner end of a rod 21 rigidly mounted substantially centrally upon the cross piece 22 of the upright 13 and strengthened by a strip 23 connected between the rods 17. An operating screw 24 is centrally threaded through the cross piece 22 of the opposite upright 14 and has a head 25 swiveled on its inner end adapted for movement into the adjacent open end of the cylinder 16 for bearing against the adjacent disk 19.

A relatively large operating wheel 26 is secured to the outer free end of the screw 24 being provided with suitable handles 27 whereby the wheel 26 and the screw 24 are revolved for forcing the head 25 inwardly of the cylinder 16 thereby compressing the oil containing material such as moist flour 28 between the opposite disks 19. All of the oil is easily extracted from the flour 28 by turning the wheel 26, as the disk 19 and head 20 are fixed to the upright 13. The oil from the cylinder 16 passes through the perforations thereof into a tube 29 located at any suitable point therebeneath.

What I claim as new is:—

An oil press comprising A-shaped uprights, positioning rods connected between said uprights, two of said rods being in the same horizontal plane, a perforated cylinder freely mounted between said last named rods, disks adapted for positioning within the opposite ends of the cylinder engaging the contents of the cylinder, a head fixedly carried by one upright adapted for engaging one of said disks, a screw threaded through the other upright in axial alinement with the cylinder, a head swiveled upon the inner end of the screw adapted for adjustable engagement with the other disk and an operating wheel upon the outer end of the screw adapted for rotation during the pressing operation.

In testimony whereof I affix my signature.

ANDREW CHERMAK.